United States Patent
Builder et al.

(10) Patent No.: US 11,628,662 B2
(45) Date of Patent: Apr. 18, 2023

(54) METHOD OF MANUFACTURE OF AN INFLATABLE PRODUCT WITH AN ATTACHABLE FOAM FINISH

(71) Applicant: Nautibuoy Marine Limited, Devon (GB)

(72) Inventors: Clay Livingston Builder, Devon (GB); Nina Anderson, Devon (GB)

(73) Assignee: Nautibuoy Marine Limited, Devon (GB)

(*) Notice: Subject to any disclaimer, the term of this patent is extended or adjusted under 35 U.S.C. 154(b) by 389 days.

(21) Appl. No.: 15/821,959

(22) Filed: Nov. 24, 2017

(65) Prior Publication Data

US 2019/0160800 A1    May 30, 2019

(51) Int. Cl.
| | |
|---|---|
| *B32B 37/12* | (2006.01) |
| *B32B 38/00* | (2006.01) |
| *B32B 5/18* | (2006.01) |
| *B32B 7/12* | (2006.01) |
| *B32B 27/06* | (2006.01) |
| *B32B 27/08* | (2006.01) |

(Continued)

(52) U.S. Cl.
CPC ............ *B32B 38/0008* (2013.01); *B32B 5/18* (2013.01); *B32B 7/12* (2013.01); *B32B 27/065* (2013.01); *B32B 27/08* (2013.01); *B32B 27/304* (2013.01); *B32B 27/306* (2013.01); *B32B 27/32* (2013.01); *B32B 37/1009* (2013.01); *B32B 37/12* (2013.01); *B32B 37/10* (2013.01); *B32B 2266/025* (2013.01); *B32B 2266/0221* (2013.01); *B32B 2266/08* (2013.01); *B32B 2305/022* (2013.01)

(58) Field of Classification Search
CPC ......... B32B 38/0008; B32B 5/18; B32B 7/12; B32B 27/065; B32B 27/08; B32B 27/304; B32B 27/306; B32B 27/32; B32B 37/1009; B32B 37/12; B32B 2305/022
USPC ....................................................... 156/272.6
See application file for complete search history.

(56) References Cited

U.S. PATENT DOCUMENTS 3,798,690 A * 3/1974 Moore ...................... B63B 5/24
114/357
5,198,271 A * 3/1993 Ishii ........................ C08L 23/02
427/244

(Continued)

FOREIGN PATENT DOCUMENTS

| DE | 102012212883 A | 5/2014 |
|---|---|---|
| JP | 2000006284 A | 1/2000 |

OTHER PUBLICATIONS

Nautibuoy Marine: "Specialists in multi-functional inflatable platforms Contents", Jan. 1, 2016 (Jan. 1, 2016), XP055476291, Retrieved from the Internet: URL://www.moremarine.nl/moremarine.nl/pdf/Nautibuoy2016-brochure.pdf [retrieved on May 17, 2018].

(Continued)

*Primary Examiner* — Scott W Dodds
(74) *Attorney, Agent, or Firm* — Optimus Patents US, LLC

(57) ABSTRACT

A method of manufacture (200) of an inflatable product with an attachable foam finish is described that includes modifying (202) a molecular structure of at least one foam sheet; gluing (206) a flexible, glueable or weldable material onto the modified at least one foam sheet to create a bonded structure; and gluing (220) the bonded structure to the inflatable product.

12 Claims, 6 Drawing Sheets

(51) Int. Cl.
*B32B 27/32* (2006.01)
*B32B 37/10* (2006.01)
*B32B 27/30* (2006.01)

(56) References Cited

U.S. PATENT DOCUMENTS

| | | | | |
|---|---|---|---|---|
| 5,360,504 | A * | 11/1994 | Fell | A61F 13/15699 |
| | | | | 156/247 |
| 5,526,767 | A * | 6/1996 | McGuiness | B29C 70/443 |
| | | | | 114/357 |
| 5,830,308 | A * | 11/1998 | Reichard | B29C 65/7855 |
| | | | | 156/291 |
| 2002/0096101 | A1 * | 7/2002 | Hansen | B63B 7/082 |
| | | | | 114/345 |
| 2005/0166820 | A1 * | 8/2005 | Hall | B63B 34/52 |
| | | | | 114/242 |

OTHER PUBLICATIONS

Nautibuoy Marine: "Specialists in multi-functional inflatable platforms", Jan. 1, 2016 (Jan. 1, 2016), XP055476287, Retrieved from the Internet URL:http://www.nauticalventures.com/static/sitefiles/inflatables-fun/nautibuoy/Nautibuoy-Brochure.pdf [retrieved on May 17, 2018].

* cited by examiner

FIG. 1 – Prior Art

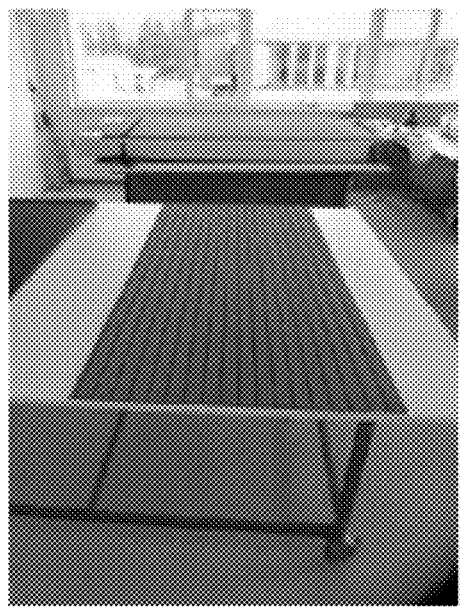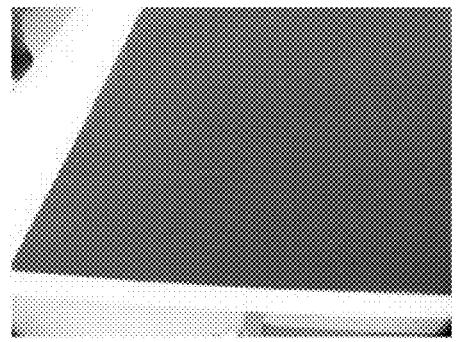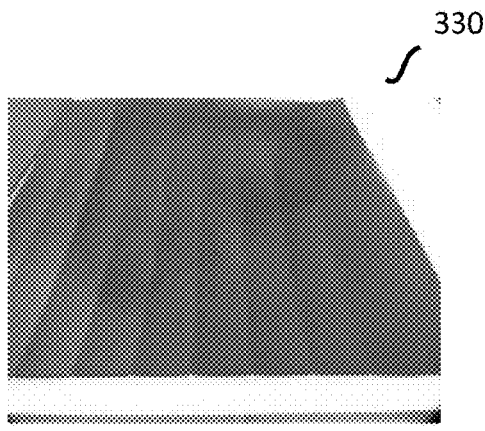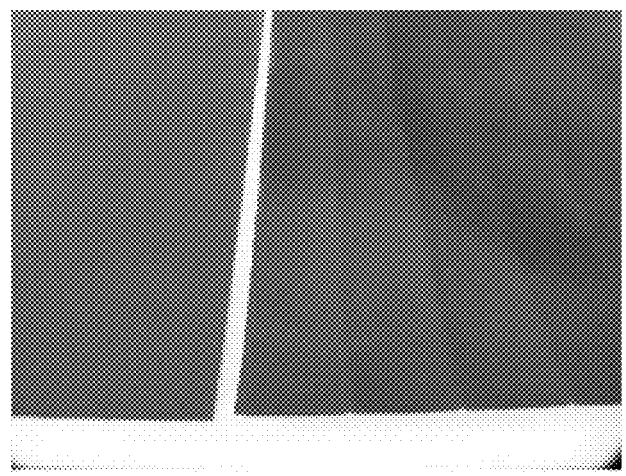
FIG. 3

410
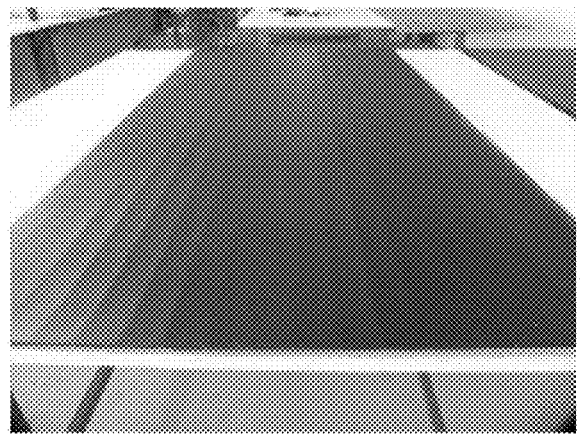
420
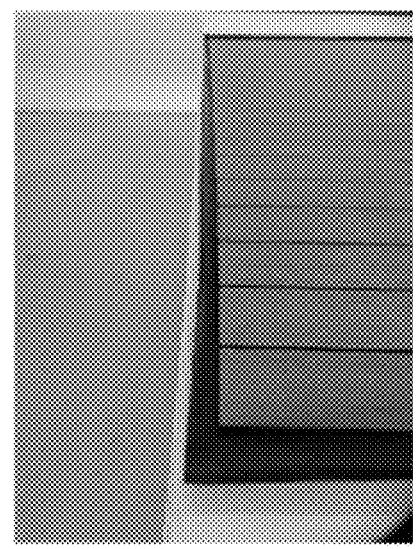
430
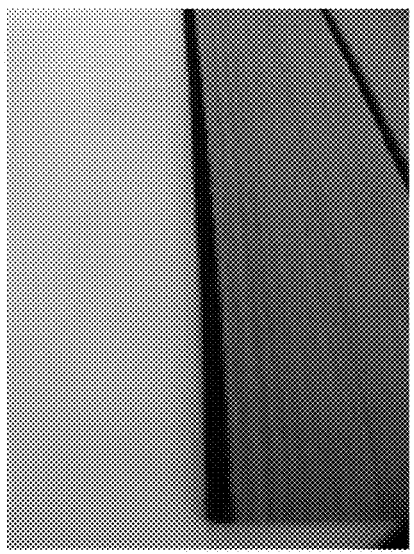
440
FIG. 4

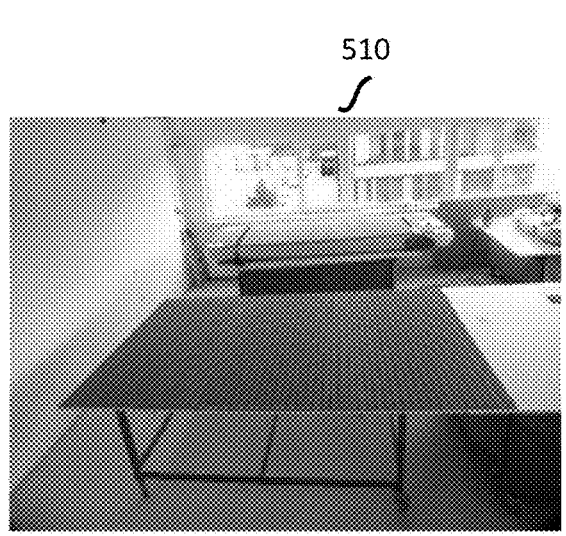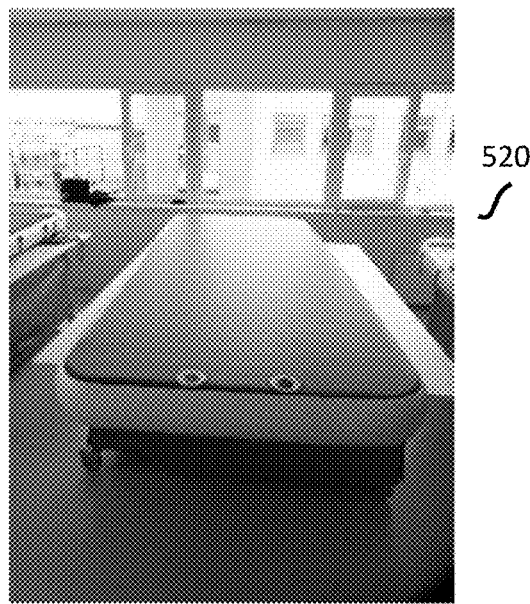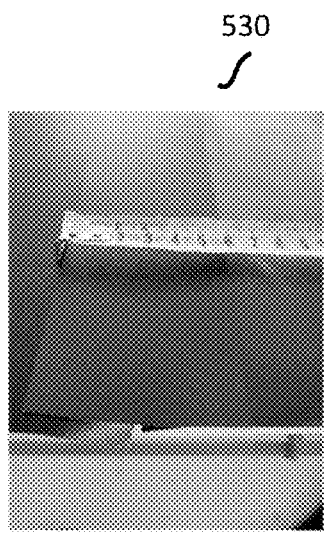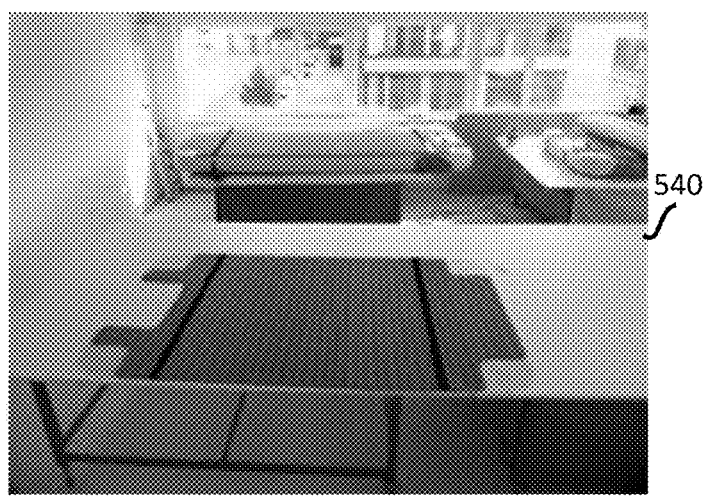
FIG. 5

METHOD OF MANUFACTURE OF AN INFLATABLE PRODUCT WITH AN ATTACHABLE FOAM FINISH

FIELD OF THE INVENTION

The field of this invention relates to a method of manufacture of an inflatable product with an attachable foam finish and an inflatable product with an attachable foam finish manufactured using said method.

BACKGROUND OF THE INVENTION

Water-based inflatable platforms have become popular as solutions for many water-based applications. For example, such inflatable platforms enable easy boat or yacht maintenance. Other example applications include leisure activities, such as sunbathing, or diving inflatable platforms. They also provide a readily extendable deck space or additional work space for boats or yachts. Also water-based applications include docking stations for watersports' equipment, jet-skis, Seabobs, surf boards, stand-up paddle boards (SUP's), etc. Also, a number of water-based sports equipment, such as surf boards and SUPs would benefit from an ability to apply different surface types to the boards.

In order to avoid slippage and for aesthetic appearances and for protection to the inflatable platform from puncture, it is important to ensure that the outer layer of the manufactured inflatable platform is made of suitable material. Such water-based inflatable platform surfaces are often made using non-slip surfaces, such as PVC™ non-skid or a Hyapalon™ layer for platforms, etc. Successfully gluing suitable non-slip foam surfaces to items to provide a long-term, resilient seal has been a major problem in the industry for many years. Numerous manufacturers have, thus far, been unsuccessful in solving this gluing problem for inflatable platform surfaces. It is known that similar problems exist for smaller items, such as water-based sports equipment, e.g. surf boards, SUPs, which also inherently require non-slip surfaces, particularly when using Polyethylene (PE) foam.

For larger inflatable platform-based applications, which covers a much larger surface area and needs to be flat (i.e. with no bubbles or lifting), a long-lasting bond is important. It is known that some manufacturers have attempted to make water-based inflatable platform surfaces by bonding Ethylene-vinyl acetate (EVA) foam on them, but these were found to be unreliable with regard to reliable long-term stickability. Some success has been achieved with sticking small EVA foam pads (i.e. of the order of much less than 1 m in at least one of the two primary (length and width) dimensions. However, this gluing approach does not work on larger surfaces (where the finish is neither long-lasting nor durable, and/or that are susceptible to air bubbles) or with other 'finish' effects, such as PE.

FIG. 1 shows three illustrations 110, 120, 130, of a bubbling effect 115, 125, 135 of a teak-surface where PE foam has been attached to a water-based inflatable platform. The PE foam sticks very well to itself and also to solid boats, such as fibre glass. However, when the two surfaces of PE foam and PVC or Hypalon™ or Neoprene™ meet, the bond does not last. This has been a known problem for a number of years amongst water-based platform manufacturers in attempting to bond such different surfaces together.

In response to this problem, a number of inflatable platform manufacturers produced a variety of different 'teak-style' appearance surfaces, which incorporates grit providing a sandpaper type feel on brown strips that are then stuck to a black backing for the caulking lines, in order to provide a non-slippable surface. However, these are uncomfortable underfoot, and feel like walking on sandpaper. These have not been popular and thus a better solution is required.

The inventors of the present invention have recognised and appreciated a need for an improved method of manufacture with an attachable foam finish, for example of a foam surface on to, say, a Polyvinyl chloride (PVC™), Hypalon™ or Neoprene™ material for connecting to an inflatable water-based platform, such as a pool surround, Jet-ski docking station, Seabob docking station, or land-based platform such as a gym mat, or water-based sports item, such as a stand-up paddle board (SUP) or a number of other applications, as identified later.

SUMMARY OF THE INVENTION

Accordingly, the invention seeks to mitigate, alleviate or eliminate one or more of the above mentioned disadvantages, either singly or in any combination. Aspects of the invention provide for a method of manufacture of an inflatable product with an attachable foam finish.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the FIGs are illustrated for simplicity and clarity and have not necessarily been drawn to scale.

FIG. 3 illustrates various views of a first-phase of a method of manufacture of a foam surface to a water-based inflatable platform according to example embodiments of the present invention.

FIG. 4 illustrates various views of the second phase of the method of manufacture of a foam surface to a water-based inflatable platform, according to example embodiments of the present invention.

FIG. 5 illustrates various views of a third phase of the method of manufacture of a foam surface to a water-based inflatable platform, according to example embodiments of the present invention.

DETAILED DESCRIPTION

Figure 1:
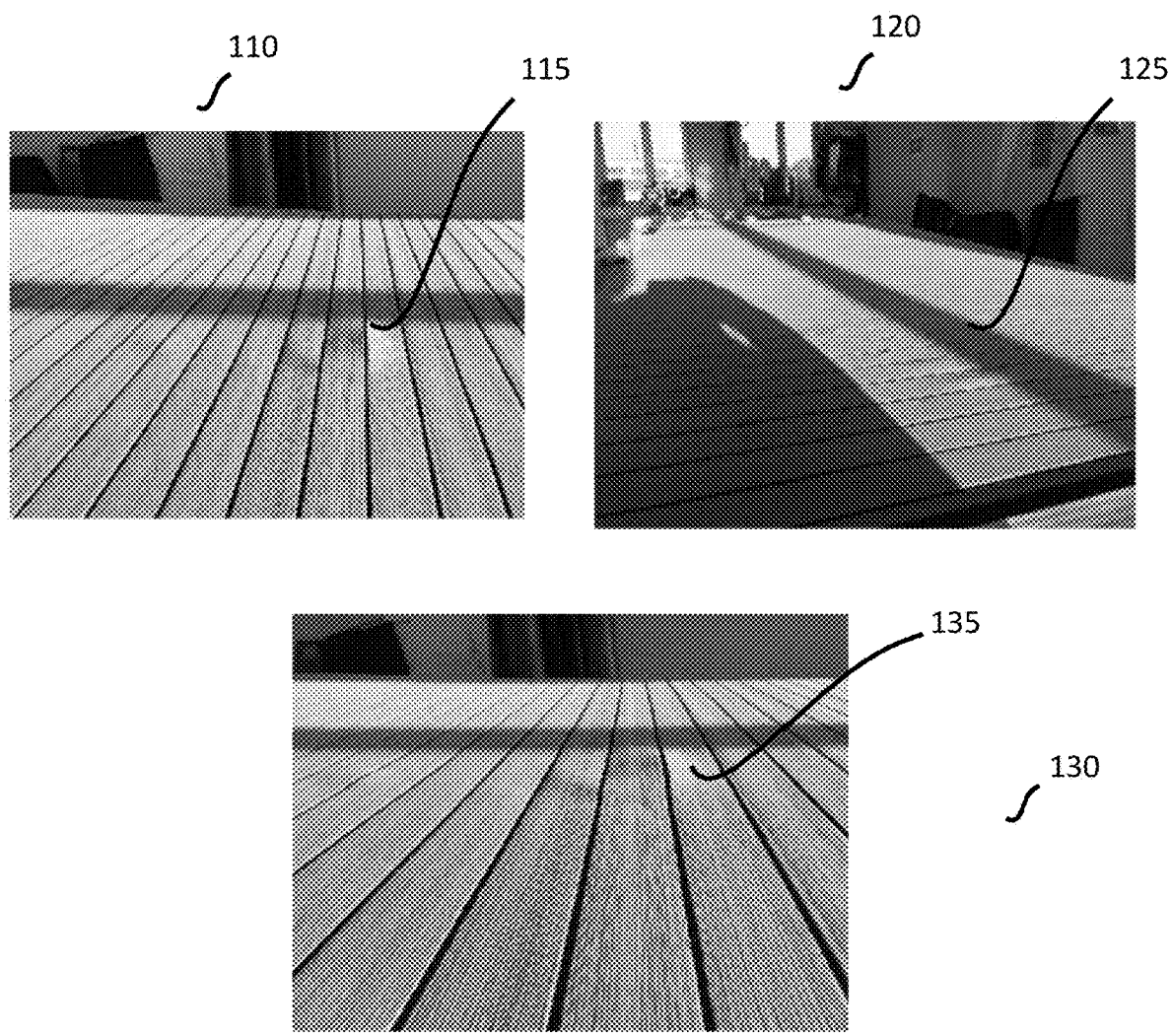
FIG. 1 illustrates various views of a water-based inflatable platform exhibiting a known bubbling effect due to the glue-bonding of the PE foam and PVC platform.

As the illustrated examples of the present invention may for the most part, be implemented using electronic components and circuits known to those skilled in the art, details will not be explained in any greater extent than that considered necessary as illustrated below, for the understanding and appreciation of the underlying concepts of the present invention and in order not to confuse or distract from the teachings of the present invention.

In particular, the field of this invention relates to a method of manufacturing an inflatable product with an attachable foam finish, by connecting foam on to a flexible, gluable and/or weldable material, such as Polyvinyl chloride (PVC™), Hypalon™ or Neoprene™, to create an attachable foam finished surface for connecting to the inflatable or inflated or partially inflated or deflated product. Furthermore, the field of this invention also relates to a method of manufacturing an inflatable product with an attachable foam finish, by modifying a molecular structure of the foam and sticking the treated form directly on to a product, such as a platform surface, for example using a high pressure roller system.

Although examples of the invention are described with reference to various sizes and shapes of inflatable platforms it is envisaged that other sizes and shapes of inflatable products may benefit from the concepts described herein.

Hereafter, the term 'flexible, glueable and/or weldable material' will be used to indicate any of PVC™, Hypalon™ or Neoprene™ (or indeed any other fabric that may be used in a manufacture of inflatable products, such as Polyurethane) that is sufficiently flexible for the application that it is being used for and that is suitable for gluing and/or welding together, unless a specific example is identified.

In some examples the inflatable products may include various finish options to the surface design, for example a) PE teak effect foam finish in various colours, b) EVA or EVA/PE blend teak effect foam finish in various colours, c) PE foam for another design and colour finish d) EVA or EVA/PE blend other design & colour finish. Hereafter, the term 'foam' is intended to cover any type of foam material or foam finish that is capable of being glued to a flexible, glueable and/or weldable material, unless a specific example is identified. Concepts described herein relate to manufacturing and applying a finish, such as a non-skid finish to an inflatable product, which may be inflated, partially inflated or deflated.

Applications include an attachable foam finish for an inflatable water-based platform, such as one or more of: an inflatable water-based platform, such as a Jet-ski docking station, Seabob docking station, an inflatable swimming pool surround, an inflatable 'air deck' platform, custom made docks, docking stations for other waterborn craft, such as sea planes, tenders, etc. inflatable beach clubs, inflatable boat bottoms, waterborn craft, inflatable water-based seats or land-based platform such as gym mats or mattresses, inflatable land-based seats, or water-based sports item, such as a stand-up paddle board (SUP), surf boards. Hereafter, the term 'inflatable product' is intended to cover any and all inflatable products, including each of the above.

It is also envisaged that some examples of the invention are equally applicable to an attachable foam finish of cover strips or portions of a product, and not necessarily the whole surface.

After many months of extensive research and trial and error with testing, the inventors of the present invention identified that a flame treatment may be employed in the early stages of manufacture, for example using a gas bottle with a high intensity flame, to treat the back of the PE foam prior to gluing. One problem that results from using flame treated is that when the flame treated foam is to be glued to a flexible, glueable and/or weldable material inflatable product surface, the surface that is to be glued or welded tends to be partially inflated so that the foam takes the right shape at full inflation. In essence, this means that the glue bonding is difficult, simply because if you are pushing down through the soft foam surface to a soft surface underneath it is difficult to obtain a good bond. This is especially the case over larger areas, such as found with inflatable product surfaces.

The inventors of the present invention identified that using this flame treated foam approach, following just the high intensity flame treatment to the back of the PE foam, bubbles would start to appear under the teak foam where the bond was not acceptable to the inflatable product. It is envisaged that a similar result would occur using EVA foam. For example, it was determined that the inflatable product would heat in the sun, the air pockets in the non-glued parts would expand and push the foam upwards and become unsightly to the top of the inflatable product.

The inventors also subsequently recognised that Corona treatment would have the same effect to the back of the PE foam as the high intensity flame treatment, allowing the flexible, glueable and/or weldable material to stick to the foam. The same problem of bubbling occurs where the bond is not acceptable.

A yet further problem was identified in that the treatment, either flame or Corona, did not last. Notably, the inventors of the present invention identified this lack of longevity as being a consequence of the Corona or flame treatment changing the molecular structure of the surface of the foam. The inventors identified that the 100% molecular change lasts only for approx. 20 mins tested within a laboratory for Corona treatment only. In some instances, it was noted that there was still some molecular change (for example around 70%) after 20 mins, which still allows (some, but slightly less than ideal) bonding to the foam. Furthermore, less than ideal results for the inflatable product with a particular finish of the present invention can be achieved by leaving a longer time before attaching the flexible, glueable and/or weldable material surface to the foam, for ideal stickability, for example from 30 mins to say two hours for, say, Corona treatment or for flame treatment is acceptable, and potentially much longer (of the order of days or weeks) may be suitable. Thus, and notably, the inventors of the present invention identified that the adhesion was not as a result of a change to the surface of the foam by burning, it was more importantly due to a change in molecular structure that has time-limited implications.

As a consequence of this determination, the inventors of the present invention have described a method of manufacture of a foam surface to a water-based inflatable product that includes the application of a layer of glue on to the back of the foam as soon as possible after foam treatment, which in some examples is either corona or flame treatment, preferably within 20 minutes of the foam treatment, in order to seal in the molecular structure change. In some examples, the gluing process requires two or three layers of glue, initially one layer of glue on the foam and one layer of glue on the flexible, glueable and/or weldable material surface.

In some examples, the manufacture should allow this first layer applied to both surface to dry to touch. Thereafter, in some examples, a second layer of glue is then applied to both surfaces and whilst they are still tacky, they are brought together to form a strong bond.

In alternative examples, so long as the first molecule sealing glue layer is applied to the foam, thereby sealing the molecules in on the foam, and allowed to dry to touch. In some examples, a first layer of glue may also be applied to the flexible, glueable and/or weldable material. In some examples, a second layer of glue is then applied to both surfaces and allowed to dry completely, a third layer of glue may then be applied to both surfaces and whilst they are still tacky, they are bought together to form a strong bond.

In some examples, a flexible, glueable and/or weldable material sheet (or other fabric that may be used in a manufacture of inflatable products) may be placed on the back of the PE foam, whilst the foam is face down on a hard surface to achieve a really good bond. Neoprene™ sticks to Hypalon™, and therefore in some examples, Neoprene™ is used to stick Neoprene™-backed foam to Hypalon™ products. The advantage of this method is that the worker can see and feel if the glue is still 'open' and assess that the two material surfaces are bonding together successfully. The hard surface of the table also allows the worker to push down with a hard implement and manipulate/work out any air bubbles. Only foam with a successful bond with the flexible glueable and/or weldable material is then taken onto the next manufacturing phase. This eliminates the problem of any future air bubbles forming at a later stage to the surface of the product, say when the foam heats in the sun.

The inventors further appreciated that gluing the entire foam surface with the flexible, glueable and/or weldable material on the back, to the inflatable product may be both expensive in terms of glue, but also labour intensive. Therefore, in some examples, only parts of the flexible, glueable and/or weldable material backed foam are glued to the surface of the inflatable product. For example, the parts that are glued may encompass one or more the following: around the full edge of the foam, on the joins (typically the foam may be joined every 1 m (approx.), under, say, the Velcro™ strips where accessories may be applied as it is important that the foam does not lift when pulling off the accessories.

However, one problem identified following a reduction in the amount of glue being used, by not gluing the foam with the flexible, glueable and/or weldable material sheet stuck to the back over the entire surface of the inflatable platform, is that there may be now a small air gap underneath the flexible, glueable and/or weldable material backed foam surface and the top surface of the platform. When heated (e.g. in the sun), it was noted that these small air gaps may push the foam up. Such air gaps form in between each glued section so approximately every 1 m or so, and the width of the inflatable platform (currently either 1.5 m or 2.0 m). In response thereto, in some examples, the inventors proposed to introduce air release gaps along the edges, for example about a 1.5-3 cm long non glued part. In some examples, these may appear approx. every 1 meter, or so, in each glued section on both sides to allow heated expanded air to escape.

The inventors determined that Neoprene™ sticks to Hypalon™, and therefore, in some examples, Neoprene™ strips, such as 6 cm wide strips that are configured for the length of the foam are used to join foam to stick to Hypalon™ platforms. In a similar manner, foam surfaces may be joined with PVC strips to stick to PVC platforms (or indeed any of the aforementioned products). In some examples, the weight of the flexible, glueable and/or weldable material glued to the back of the foam also acts as a weight to pull the foam down and not lift as much (say, in the heat of the sun), or allow the foam to expand and stretch in to bubbles.

In some examples, it is envisaged that the concepts described herein may be used in land-based platforms, such as with air tracks for gym equipment, etc. Here, in land-based platforms as compared to water-based platforms, ballasts are not required.

In some examples, it is envisaged that the manufacturing concepts described herein may be achieved using a vacuum process to apply pressure between the respective layers when glued, for example to minimise the risk of air gaps. It is envisaged that the vacuum process may be used to glue the PVC (or other flexible, glueable and/or weldable material) backed foam and gluing the foam to the entire surface of the product, or the surface of the product just round the edges and at the joins of the foam, as the vacuum could apply the pressure needed, in order to reduce or eliminate any air pockets in between each section. In alternative examples, it is envisaged that a high-pressure roller system may be equally employed to apply the PVC (or other flexible, glueable and/or weldable material) backed foam pad to the surface of the platform or product across the entire surface or around the edges and joins, in order to minimise and push out the air left underneath.

In some examples, it is envisaged that a method of manufacture of an inflatable product may include modifying a molecular structure of at least one foam surface; and gluing a flexible, glueable and/or weldable material directly onto the modified at least one foam surface and concurrently gluing the modified at least one foam surface to the inflatable product using, say, a high pressure roller system or a vacuum pressure approach to achieve a good bond on the entire surface (or part, e.g. around the edges and/or joins) of the inflatable product and foam. It is envisaged that the concurrent gluing of the modified at least one foam surface to the inflatable product may be most suitable for small items, or for items that are not in the sun, as foam with no PVC, etc., on the back of the surface, may well expand and bubble in the heat of the sun in all of the non-glued section.

Thus, in this manner, it is possible to glue on the entire corona or flame treated foam pad, without needing an intermediate flexible, glueable and/or weldable material. The foam pad needs to be applied quickly when the glue is still tacky and still within the period where the glue is still tacky. It is envisaged that this 'tacky period' (sometimes referred to as 'open time') is also dependent on the glue type, and in some examples with some glues the 'tacky period' may be longer or shorter than 30 mins. In some examples, it is envisaged that the 'open time' for some glues may be extended by heating with a hot air gun.

There are three types of foam that the inventors have identified that provide an aesthetic teak-effect, with reduced slippage surface, namely closed cell foams such as Ethylene-Vinyl Acetate (EVA) and Polyethylene closed cell foam, also called PE foam, and a PE/EVA foam mix. In alternative examples, other foams with a non-teak effect may be employed. All foam types do not bond well to PVC or Hypalon™ or Neoprene™. Hypalon™ is a chlorosulfonated polyethylene (CSPE) synthetic rubber (CSM), noted for its resistance to chemicals, temperature extremes, and ultraviolet light. Polyvinyl Chloride (PVC) is a common thermoplastic used in construction, available in two forms: rigid and flexible, and generally known for its hardness. Neoprene™ rubber is a highly resistant synthetic material and is used for a variety of outdoor and marine applications. Also known as polychloroprene and invented by DuPont in 1931, it is produced by the polymerization of chloroprene. Neoprene™ rubber resists degradation more than natural or synthetic rubber.

The inventors identified that PE will just not stick to the flexible, glueable and/or weldable material, as it has a slightly shiny surface on the back and a molecular structure that doesn't allow the bond and it just peels away. EVA bonds function better initially, but have been found to lift over time. Such a foam-flexible, glueable and/or weldable material bonded arrangement is also used on PVC stand up paddle boards, for example. It is a small pad that can be replaced. In the examples of an inflatable platform, a typical thickness of the foam is of the order of a 6 mm layer, e.g. a 3 mm layer of brown foam & a 3 mm layer of black foam sandwiched together, for example with the lines cut out to create a suitable visual effect. In contrast, a PVC SUP may employ a foam layer of about 3 mm thick.

In the manufacture (or refurbishment) of SUPs or surf boards, it is envisaged that a pad to be applied to the SUP or surf board is first treated with burning or corona treatment, following which the molecular change is sealed using glue. The SUP board or surf board may be partially inflated when a pad is glued to the board. Alternatively, it is envisaged that the pad may be first positioned when the SUP or surf board is inflated, then the board may be deflated thereby allowing the pad to be then pushed down to, say, a hard surface of a table to achieve a good bond. Thereafter, the board may be inflated immediately in order to set glue in right place. In some alternative examples, it is envisaged that the SUPs may be inflated to, say, 1378 mb/20 psi, thereby providing a very rigid and hard surface in order to put the foam on and push down upon, i.e. apply at full inflation. In some examples, it is also envisaged that the foam pad being applied to the SUP board or surf board may be automated, for example using a high pressure roller system.

Although examples of the invention are described with reference to a method of manufacture of inflatable products with an aesthetic teak-effect, it is envisaged that other examples of manufacture may be used with other (e.g. non-teak) foam surface effects.

Figure 2:
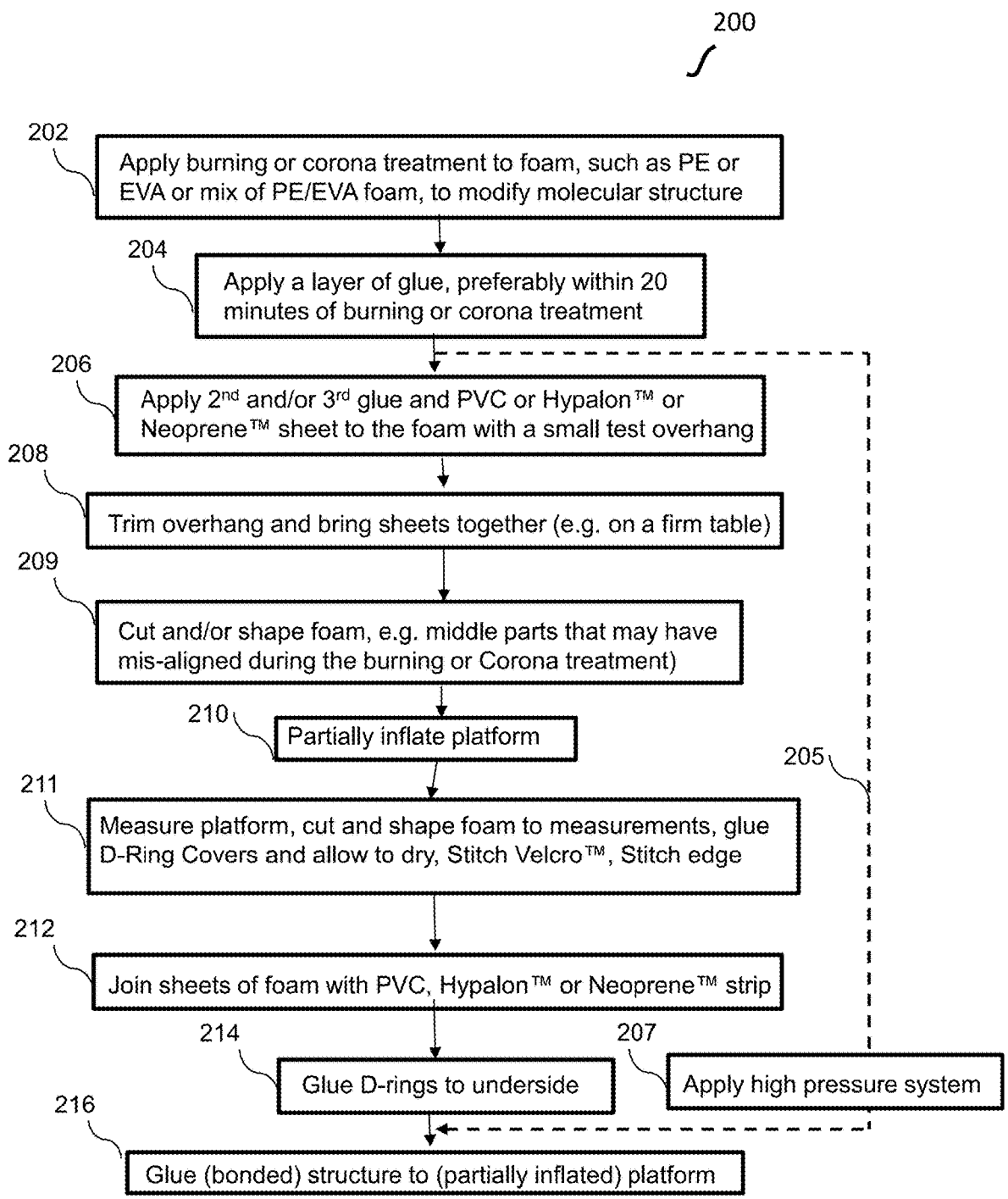
FIG. 2 illustrates an example flowchart of a method of manufacture of a platform according to example embodiments of the present invention.

Referring now to FIG. 2, an example flowchart 200 illustrates a method of manufacture of an inflatable product according to example embodiments of the present invention. In contrast to the known approach of joining the foam sheets together, then gluing straight to the surface of the platform, which has been shown as not proving a reliable and lasting bond, examples of the invention apply burning or corona treatment first to the foam underside surfaces at 202, which are later joined, cut and shaped. This burning or corona treatment to modifies the molecular structure and helps to create a bond to the flexible, glueable and/or weldable material.

However, as recognised and appreciated by the inventors, it is the application of the foam to the partially inflated platform that created a further problem to be solved. In essence, the manufacturing technician manufacturing inflatable products using the known process was unable to apply sufficient force through the soft foam on to a soft surface of the partially inflated platform to achieve good enough adhesion. Even if the product (or platform in some instances) was fully inflated, e.g. at 5.5 psi/379 mb it would still be difficult to push through a soft surface of foam and ensure a good bond. Irrespective, of the pressure level, the bonding requires pushing through the soft foam first and thus it is difficult to ensure manually a good enough bond. Furthermore, it is noted that it is typically difficult for the technician to see the bond too as the technician works from the top of the foam down, which makes it difficult or impossible for the technician to assess whether the total surface of the foam has bonded.

Thus, in accordance with examples of the invention, the inventors determined that a layer of glue is applied to the back of the burnt or corona treated foam surface (which in some examples may be in a form of a foam sheet) at 204, in order to seal in the molecular structure change imparted due to the burning or corona treatment. In some examples, the layer of glue may be applied to the burnt or corona treated foam surface at 204 within a relatively short period of time, say within 20 minutes (although this time limit could vary dependent upon the application and materials being used. In some examples, whilst gluing, the technician may glue all of the foam surface or a partial amount thereof, say, apply glue at every 1 m. In some optional examples, a first layer of glue may also be applied to the flexible, glueable and/or weldable material (such as PVC) at this stage e.g., at the same time as glue is applied to the burnt or corona treated foam. Additionally, the glue is allowed to dry to the touch. The burnt or corona treated foam surfaces require a reasonably quick application of, say, glue, to seal in the molecular change to the foam. Ideally, the burnt or corona treated foam surfaces will not be subjected to any, or significant, amounts of touching that may impact the sealing of the molecular change.

In accordance with examples of the invention, the inventors determined that, at 206, a second (and optionally a third) application of glue may be applied to both a back of the flexible, glueable and/or weldable material sheet (e.g. a PVC or Hypalon or Neoprene™ sheet) and to the burnt or corona treated foam and attached together with a small test overhang of the PVC, Hypalon™ or Neoprene™. The second layer of glue is applied to both surfaces such that they are bought together when tacky. If a third layer of glue is employed, then the second layer is allowed to dry to the touch before the $3^{rd}$ layer is applied and both surfaces are bought together when tacky. Bringing the surfaces together at this point creates a reliable and long-lasting bond, under pressure and prevents a formation of large air bubbles. As will be appreciated, it is important to apply pressure such that any air bubbles can be worked out. In the gluing process, the technician is able to recognize air bubbles and apply pressure at suitable places. In some examples, a heat gun may be used to affect the drying times of the glue, in order to make it tacky again. It is also envisaged that in some examples the hot air gun may applied to the glue on the foam. In some examples, it is envisaged that the manufacturing process may be wholly automated for a quick and efficient bond.

At 208, the overhang may be trimmed and the PVC, Hypalon™ or Neoprene™-backed foam surfaces (for example in the form of sheets) brought together (e.g. on a firm table). Before the overhang is trimmed the bond needs to be tested. The glue must be dried before the test can begin. Therefore, in some examples, a minimum of a day's delay may be used depending upon glue used. The inventors of the present invention identified that it takes approx. 3 days for full drying time using a typical glue, but the test of the bond can be done after 1 day. The overhang is pulled away from the foam sheet to the full surround. It is particularly important along the sides of the foam that will be joined. If the bond is not good, say due to insufficient burning or corona treatment to the edges, then the foam can be trimmed and the test performed again before final joining. This is a good test to see if the corona or burning treatment has been successful.

Next, at 209, cutting and/or shaping of the foam surfaces (e.g. foam sheets) may be performed, e.g. addressing middle parts of the respective sheets that may have become misaligned during the burning or Corona treatment. In this manner, the foam surfaces (e.g. foam sheets) are brought together to provide an appearance of one large piece of teak foam. In other examples, these foam surfaces (e.g. foam sheets) may be cut and/or shaped any time after 202. The inventors have also identified that the Corona treatment doesn't tend to change the shape of the foam, unlike burning, therefore in some examples it is envisaged that the foam may be cut and shaped before corona treatment.

At this stage, in some examples, and at 210, the inflatable product may be partially inflated (or in some examples fully inflated). In an inflatable platform example, it is envisaged that in some examples the inflatable platform would need to be fully (or nearly fully) inflated for the foam to be measured and cut to a correct shape. In some examples, partial inflation is performed at a PVC Hypalon™ or Neoprene™-backed foam application stage 220, when glue is applied around some or all of the edges. Thereafter, when the product is fully inflated it pulls the foam pad tight in appearance, and results with no wrinkles in the appearance of the foam.

It is envisaged that a manufacturer may apply a trade-off between a need to glue the entire sheet of PVC Hypalon™ or Neoprene™-backed foam to the platform surface and the extent of partial inflation. The inventors have identified that the amount of glue and the level of partial inflation may be dependent upon the size of the inflatable product and the scale of the foam coverage, in order to ensure that the PVC backed foam is stretched tight when inflated but avoids resulting in a banana-shape of the inflatable product. This trade-off between gluing, partial (or full) inflation and avoiding a potential banana-shape problem may happen when partially (or fully) gluing of the foam pad just round the edges of the foam and along each join too.

Next, at 211, each individual platform is measured and the foam surface (e.g. foam sheets), cut and shaped to fit the specific platform measurements. Additionally, in some platform-based examples, D-Ring covers may be glued to an underside of the foam surface (e.g. foam sheet) and allowed to dry, and the Velcro™ stitched to the top and the edge of the foam stitched. It is envisaged that in other examples, a different order to some steps of the manufacturing process may be applied, e.g., the edge of the foam could be stitched first and then the D-Ring covers glued on. Alternatively, for example, a different order may include gluing sheets together then cut and shape.

Next, at 212 all the sheets (e.g. 1 m×2 m) of foam with material on the back are joined together with the flexible, glueable and/or weldable material (e.g. PVC, Hypalon or Neoprene) for example in 6 cm wide joining strips of material, which run the length of the foam surfaces or sheets being joined. The joining strip material should match the material to the back of the sheet of the foam, e.g., PVC to PVC, although as Hypalon™ sticks to Neoprene™, those sheets backed in Hypalon™ or Neoprene™ can be joined with either of these materials.

In other examples, it is envisaged that the foam could be joined with these joining strips after the burning and corona treatment, without necessarily applying the PVC, Hypalon™ or Neoprene™ to the back of the foam first. Hence, the remaining part of the uncovered foam could then have PVC, Hypalon™ or Neoprene™ subsequently applied, or just not bother to apply PVC, Hypalon™ or Neoprene™ to the remaining part if it was for a small (e.g. 'pad') surface area, or when used with a high pressure application system, etc.

Next, at 214, in platform-based examples, the D-rings are glued to the underside of the D-Ring covers. However, it is envisaged that in other examples that the D-Rings may be glued at any stage to the underside.

Finally, the bonded structure is then glued to the partially inflated platform at 216 with, in some examples, glue applied round the full edge with air vents, fully under the D-ring part (which is very important as a strong bond is essential), under the joins of the foam, under Velcro™ etc. In some examples, air escape gaps may be provided at approx. 2 cm, on either edge of each section along the edge, when gluing the entire sheet of foam to the surface of the partially inflated platform, in order to allow air to escape. As mentioned, the product, or platform in this particular example, may be fully inflated or deflated in other examples when the final gluing is performed. Also, as mentioned in other examples, the final gluing may be performed around the edges of the product, or platform in this particular example, and not under each join or the Velcro strips etc. Thus, it is envisaged that the final bonded structure may be glued on in many different ways, either in part or as a whole.

Thus, the combination of the approaches adopted in 202 with 206 solves the known problems during the process of being able to attach a reliable and long-lasting surface to an inflated or partially inflated (or indeed deflated) product.

In alternative examples, it is envisaged that a high pressure system may be employed after the step of applying burning or corona treatment to the foam in order to modify the molecular structure and help to create a bond to the flexible, glueable and/or weldable material. In this example, a layer of glue is applied to the back of the burnt or corona treated foam surface (which in some examples may be in a form of a foam sheet) at 204, in order to seal in the molecular structure change imparted due to the burning or corona treatment. In order to take the next path, a first layer of glue would need to be applied to the top platform surface, followed by $2^{nd}$ or $3^{rd}$ layers on both the foam and platform surfaces and bought together when tacky to achieve a good bond. This is where the 'open time' of the glue is an important factor in the manufacturing process and a quick (or automated) approach to applying the glue to both surfaces is an important consideration. For example, there could be 15 mins-30 mins 'open time' on both surfaces in order to achieve the bond, then a high pressure system may be applied (e.g. in an automated process). Thereafter, a different path may be taken at 205 and it is envisaged that the high pressure system at 207 may apply the burnt or corona treated foam, with the molecular change sealed by the glue, direct to the product, e.g. a platform that is either deflated, partially inflated or inflated at 220. In some examples, the high pressure system may be a roller-based system where a roller is configured to apply pressure to the product and the burnt or corona treated foam when the glue retains sufficient stickiness. Similarly, in some examples, the high pressure system may be a vacuum-based system where a vacuum is created in a sealed enclosure to apply pressure to the product and the burnt or corona treated foam when the glue retains sufficient stickiness. In these examples, no intermediate bonded structure is employed.

Again, in this example of a high pressure system, it is envisaged that examples may employ one or more of the intervening steps relating to constructing the product or the foam in a suitable shape or form, e.g. trim and join one or more sheets at 208, or cut or shape foam 209, or use partially inflated, deflated or inflated product at 210 or apply other items to the product, such as D-rings, stitch Velcro or stitching, at 211, say.

Referring now to FIG. 3 various views of a first phase of the method of manufacture of a foam surface to a water-based inflatable platform are illustrated according to example embodiments of the present invention. A first pictorial view 310 illustrates a PE foam sheet. In this example, the PE foam sheet is of a size of 102 cm wide by 203 cm long. However, it is envisaged in other examples that smaller or larger sheets may be used, for example with 1.5 m wide and shorter length of 1.5 m, or for use in manufacturing custom-made docking stations or very long inflatable platforms sheets of 102 cm wide by up to 10 m long may be employed. A second view 320 illustrates the foam with a slightly shiny surface to the back. A third view 330 illustrates the foam after high intensity flame treatment. A fourth view 340 illustrates a comparison of the foam together, before and after the high intensity foam treatment. In some examples, it is envisaged that the burning phase may also be applied to EVA foam or a PE/EVA foam mix.

Referring now to FIG. 4 various views of a second phase of the method of manufacture of a foam surface to a water-based inflatable platform are illustrated according to example embodiments of the present invention. This second phase follows the first phase of burning or corona treatment, and includes applying the glue and flexible, glueable and/or weldable material sheet.

A first pictorial view 410 illustrates a foam sheet with a black PVC version of the flexible, glueable and/or weldable material located on the back. In some examples, a black PVC version of the flexible, glueable and/or weldable material may be used as the lines on the teak effect foam are black and the PVC material colour is chosen to match. The foam is joined in the lines and a matching colour of PVC to the lines means that the joins can be hidden from view. In other examples, the lines on the foam may be provided and available in different colours, and in such situations a different colour PVC to match the lines may be chosen. A second view 420 illustrates the extra PVC overhang of the PVC sheet to pull on to test bond of the glue either partially or all the way round. In a partial glue process, for example on three sides, it is possible to line up the first edge with no overhang and the overhang is purely so there is enough PVC to cover the sheet and not have to be precise in the gluing process. A third view 430 illustrates the foam cut along black lines for joining. A fourth view 440 illustrates the foam bought together to be joined along the black lines. The foam is cut to shape at this stage, so that the joins are seamless and not visible. For example, in some applications, the foam may have shrunk or become mis-shapen through the burning process.

Referring now to FIG. 5 various views of a third phase of the method of manufacture of a PE teak foam surface for a water-based inflatable platform are illustrated according to example embodiments of the present invention.

A first pictorial view at 510, illustrates foam sheets that are bought together after cutting and shaping along the joins. Here, no gluing is performed, as the foam sheets are just brought together exactly for outside shaping & cutting. A second pictorial view at 520, illustrates an inflated or partially inflated platform, which may be used to measure and to fit the foam. The platform can be inflated at any time in the process though.

A third pictorial view 560 illustrates two sheets of PE teak foam with black PVC sheet back joined together to the underside using a black PVC strip. In examples of the invention, the PVC to PVC bond is very strong. Thus the PVC to the back of the foam bonds very well to the black PVC strip. In other examples two sheets of teak foam, each with a Neoprene™ sheet back, could be joined with a black Neoprene™ strip. In other examples a Hypalon™ backed sheet of foam could either be joined with a Neoprene™ Strip of a Hypalon™ Strip. Hypalon™ & Neoprene™ bond to each other but do not bond well to PVC, due to plastisiation migration, the transfer of polymers form from the PVC that, over time, eats away and damages the Hypalon™.

A fourth view 570 illustrates the shape of the joined foam sheets after gluing and after the joined foam is cut to shape, the D-ring covers are glued on, the Velcro™ is stitched to the foam, and the foam stitched to the edge.

Figure 6:
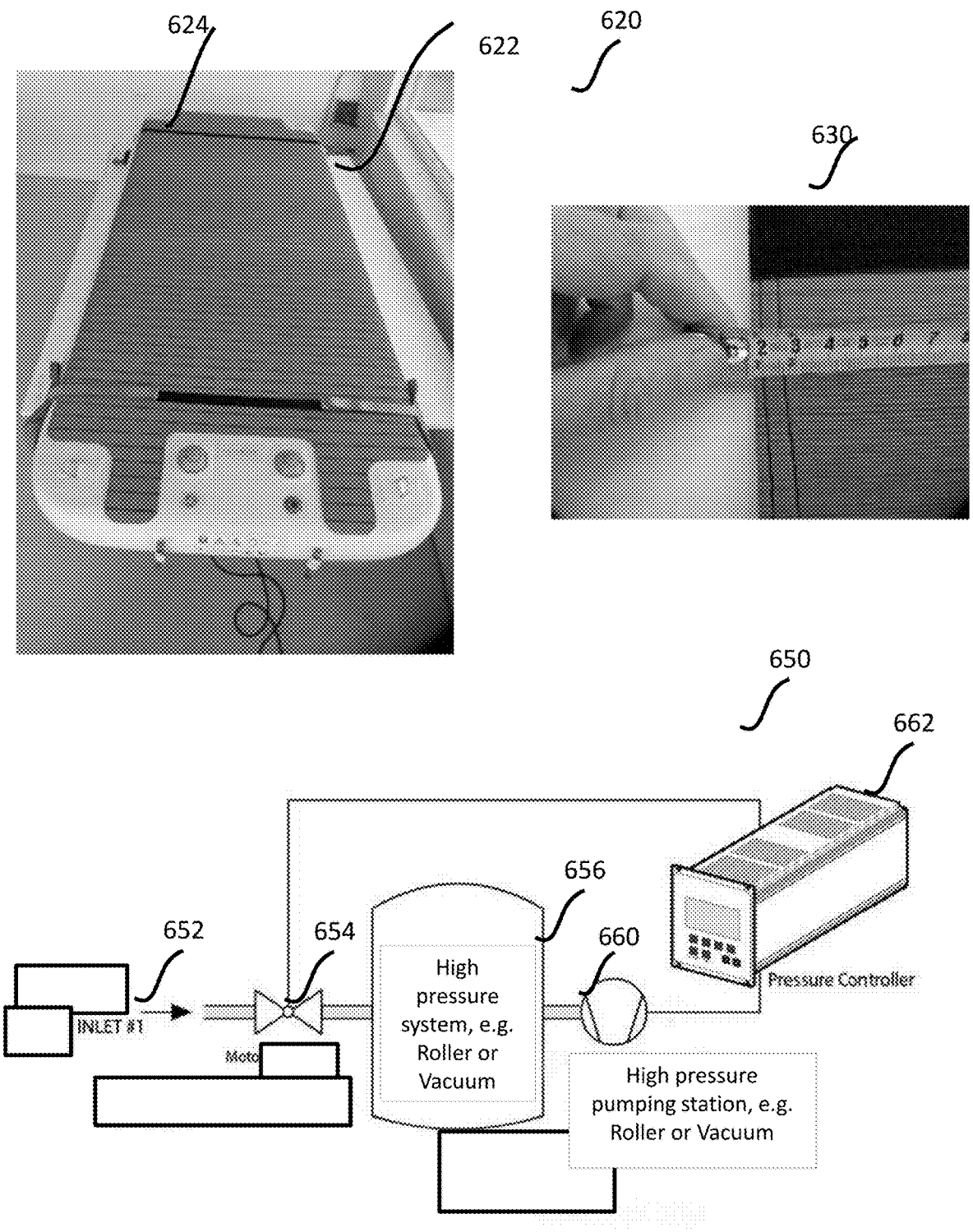
FIG. 6 illustrates various views of a fourth phase of the method of manufacture of a foam surface to a water-based inflatable platform, and a high pressure system according to some example embodiments of the present invention.

Referring now to FIG. 6, a view of a water-based inflatable platform following the method of manufacture as described herein is illustrated, according to example embodiments of the present invention. A view 620 illustrates the foam glued 622 to the inflatable platform, around the full edge 624, under the Velcro™ strips, under each join (at approx. every 1 m) and fully under the D-Rings, as illustrated. A problem with other known foam pads is that the edge can start to lift. Therefore, examples of the invention propose, in a fourth stage, stitching straight through the foam with PVC on the back, at 630, which helps prevent any fraying and wear of the foam on the ends, for example as a result of repetitive collisions with, say, jet-skis, etc.

In some examples the inflatable products may include various finish options to the surface design, for example a) PE teak effect foam finish in various colours, b) EVA or EVA/PE blend teak effect foam finish in various colours, c) PE foam for another design and colour finish d) EVA or EVA/PE blend other design & colour finish.

FIG. 6 also illustrates one example of a high pressure system 650 that may be employed according to some examples of the invention. The high pressure system 650 includes an inlet 652 coupled to a motor 654 that operates a high pressure system, such as a vacuum system 656. The motor may also supply a pressure controller 662 that controls the amount of pressure to be applied, for example through a high-vacuum pressure station 660, when gluing the inflatable product to an attachable foam finish.

In the foregoing specification, an invention has been described with reference to specific illustrated examples. It will, however, be evident that various modifications and changes may be made therein without departing from the scope of the invention.

The sizes and locations of particular components need not be exactly as shown, as the drawings and description enable a skilled person to replicate the concepts described herein.

Any arrangement of components to achieve the same functionality is effectively 'associated such that the desired functionality is achieved. Furthermore, it is envisaged that the order of the operations in FIG. 2 may be changed, for example dependent upon the manufacturing circumstances, the materials being used and product being manufactured. Hence, any two components herein combined to achieve a particular functionality can be 'associated with' each other such that the desired functionality is achieved, irrespective of architectures or intermediary components. Likewise, two components so associated can also be viewed as being 'operably connected', or 'operably coupled' to each other to achieve the desired functionality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention.

Thus, an improved solution is described for method of manufacture of an inflatable product with an attachable foam finish. The herein described system provides a secure mechanism for connecting a flexible, glueable and/or weldable material layer to a PE, PE/EVA mix or EVA foam, advantageously to secure them the foam for use in the water or on land or with any of the aforementioned applications.

In this manner, the inventors of the present invention have recognised and appreciated a number of problems with existing designs, which have been substantially alleviated with the concepts described herein.

We claim:

1. A method of manufacture of an inflatable product having an exterior foam finish comprising the steps of:
providing the inflatable product, the inflatable product configured for use as a water-based recreational device;
modifying a molecular structure of at least one foam sheet to form a modified surface on the at least one foam sheet;
gluing a flexible, gluable, and/or weldable material onto the modified surface to create a bonded structure; and
gluing the bonded structure to a top surface of the inflatable product to provide the at least one foam sheet as the exterior foam finish, and
wherein the exterior foam finish is configured to provide an aesthetic effect and a reduced slippage surface to the top surface of the inflatable product.

2. The method of manufacture of the inflatable product having the exterior foam finish of claim 1, wherein modifying the molecular structure of the at least one foam sheet is carried out by: burning the at least one foam sheet, or applying a corona treatment to the at least one foam sheet.

3. The method of manufacture of the inflatable product having the exterior foam finish of claim 1, wherein the flexible, glueable and/or weldable material is selected from the group consisting of: polyvinyl chloride, or chlorosulfonated polyethylene synthetic rubber, or polychloroprene Polyurethane, or combinations thereof.

4. The method of manufacture of the inflatable product having the exterior foam finish of claim 1, wherein modifying the molecular structure of at least one foam sheet comprises modifying the molecular structure prior to applying glue within a time-limited period wherein the application of glue substantially seals in the modified molecular structure.

5. The method of manufacture of the inflatable product having the exterior foam finish of claim 4, wherein the time-limited period that substantially seals in the modified molecular structure is less than six months.

6. The method of manufacture of the inflatable product having the exterior foam finish of claim 5, wherein the time-limited period that substantially seals in the modified molecular structure is less than thirty minutes.

7. The method of manufacture of the inflatable product having the exterior foam finish of claim 1, further comprising partially inflating the inflatable product prior to the step of gluing the bonded structure to the top surface of the inflatable product.

8. The method of manufacture of the inflatable product having the exterior foam finish of claim 1, wherein the at least one foam sheet is selected from the group consisting of: Polyethylene foam, Ethylene-vinyl acetate foam, and a mix of polyethylene/Ethylene-vinyl acetate foam.

9. The method of manufacture of the inflatable product having the exterior foam finish of claim 1, wherein gluing the bonded structure to the top surface of the inflatable product comprises applying glue to at least one or more separated areas of the bonded structure.

10. The method of manufacture of the inflatable product having the exterior foam finish of claim 9, wherein gluing the bonded structure to the top surface of the inflatable product comprises introducing air release gaps along the edges between the bonded structure and the inflatable product.

11. The method of manufacture of the inflatable product having the exterior foam finish of claim 1, further comprising:
using a high pressure system to carry out the step of gluing of the bonded structure to the top surface of the inflatable product.

12. The method of manufacture of the inflatable product having the exterior foam finish of claim 11, wherein the high pressure system is selected from the group consisting of: a high pressure roller system, a vacuum pressure system, and a high-pressure press.

* * * * *